July 3, 1934.  H. GEYER  1,965,337
APPARATUS FOR LOCATING PLACES ON MAPS
Filed May 25, 1929
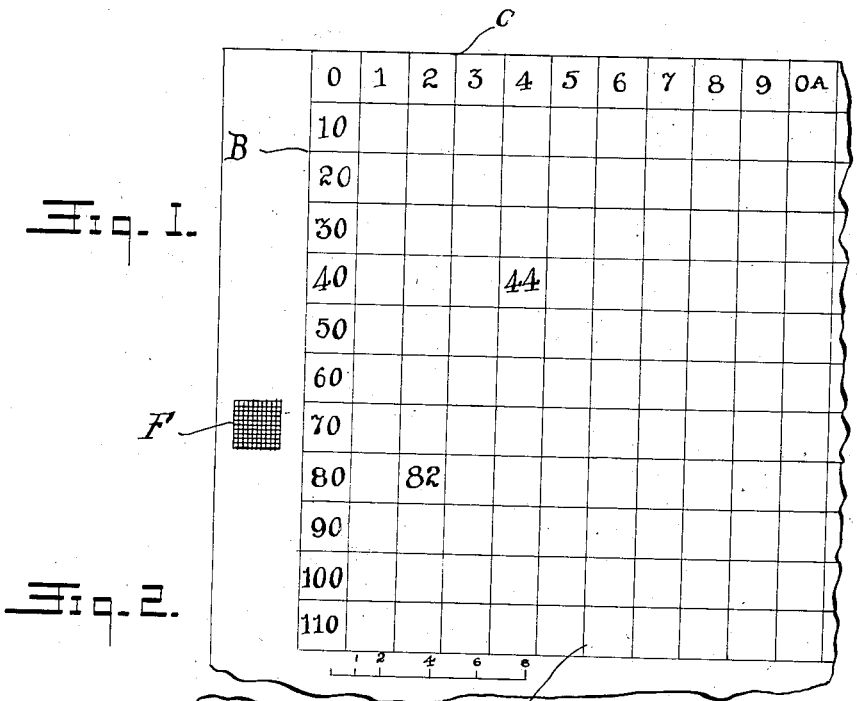
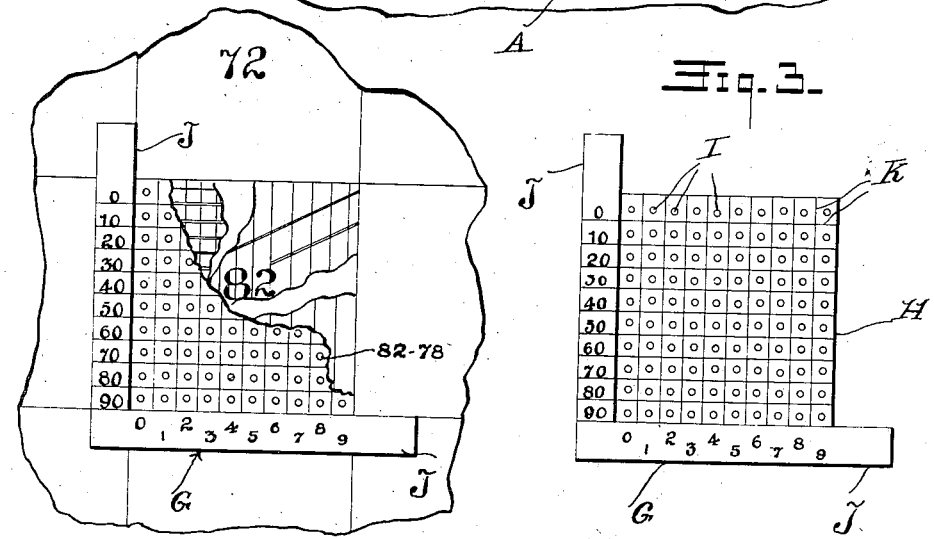
WITNESS:
INVENTOR
Herman Geyer
BY
Joshua R. H. Potts
ATTORNEY Patented July 3, 1934

1,965,337

UNITED STATES PATENT OFFICE 1,965,337

APPARATUS FOR LOCATING PLACES ON MAPS

Herman Geyer, Camden, N. J.

Application May 25, 1929, Serial No. 365,863

3 Claims. (Cl. 33—1)

The present invention relates to maps, plans and the like and particularly to the locating of points on said maps, plans, etc.

An object of the invention is to facilitate the locating of points and places on a map, plan or the like.

Another object is to provide instrumentalities for locating points on a map or plan which are simple in construction and in operation.

The above objects are accomplished by providing co-ordinates from which lines imaginary or real run, crossing at or near the location of the points and places on a map or plan, and dividing the map into regions; said crossing lines having a number associated therewith constituting one of a pair of digits which are associated in a catalogue or directory with the names or designations of the various places or points.

In cases of a large map or plan with a complication of details thereon, the map or plan may be divided into squares located by numbers or co-ordinates and each square may be similarly subdivided by a key square which may be in the nature of a square of the dimensions of any one of the squares of the map subdivided into equal parts, say one hundred, which square may be printed on the map or may be located on a separate sheet or the subdividing of the squares may be accomplished by a key square in the nature of an instrument having an L-shaped portion to be placed with the legs on two sides of the squares and having digits making up a second number associated with the names or designations of places and points in the catalogue or directory.

The instrument may be further provided with a square to be placed over and coinciding with the square of the map. This square of the instrument may have lines thereon crossing at or near the point or place to which they relate in the catalogue.

For a fuller understanding of the invention, reference may be made to the accompanying drawing illustrative of the principles hereinbefore laid down.

In the drawing:

Figure 1 is a map or plan laid off in squares and marginally numbered in accordance with the principles of the invention, Figure 2 is an enlarged fragment of this map showing a place finding instrument applied to one of the squares, Figure 3 shows a form of the instrument per se, and Figure 4 is a fragment of a directory showing the association of the location numbers with names of places in the directory and occurring on the associated map.

Referring to the drawing in detail by reference characters, A designates a plan or map and B and C are co-ordinates running at right angles marginally of the map and, as shown, having lines at regular intervals extending therefrom and dividing the map into a number of squares, the ends of these lines being designated by numerals as shown, running from zero to OA across the top margin and from zero to 110 along one side margin (Fig. 1). It will be understood that the series of numbers may continue indefinitely in both directions but it is preferable to have a plurality of series of numbers running from zero to nine along the top margin, the successive series being given successive letters of the alphabet as a designation.

To locate a square of a given number therefore, say square 44, one would find 40 on the side margin and 4 on the top margin and the crossing of lines running from these numbers will locate the square. These two numerals may be associated with the name of the place located within this square in a directory or catalogue, as indicated at D in Figure 4 of the drawing.

To more definitely located a place lying within this square, say a village, or if the map is of a city or a place of business, the squares may be further subdivided into a number of parts, say one hundred, and the places in the subdivisions given a second number of at least two digits which digits are placed at the marginal ends of co-ordinates crossing adjacent the places within the large squares and locating the places in question with such definiteness as to make it a simple matter to quickly find the place or point in question.

These second numbers are also associated in the catalogue or directory with the names of places to which they relate in any suitable manner, for example, separating this second number from the first by a hyphen or as at E, (Fig. 4) as a sub to the first number.

The numerals constituting the digits of the second or square numbers may be located on a key square as shown at F on the margin of the map, (Fig. 1) or they may be inscribed marginally of a key square in the nature of an instrument G, which I may call a "place finder" (see Fig. 3) and which may be comprised of an L-shaped member having two legs at right angles to each other adapted to be positioned marginally of the squares of a given map and which is provided along each leg with numerals consisting of digits of the second or square location number for places within a square on the map.

This instrument may also be provided with a square H equal in area to the squares on the map and adapted to be placed over the map squares, as shown in Figure 2 of the drawing. One of the instruments G will be provided with each map and made to correspond in dimensions to the scale of the map and to the size of the squares, and may be of celluloid or other transparent material, or may be opaque with holes therein aligned in rows with the marginal numerals, as at I and the legs of the L-shaped members may be provided with extensions J as guides for properly positioning the square of the instrument on the square of the map. The instrument may also be of transparent material with the addition of perforations as described and/or may have score lines K running from the marginal numerals transversely of the square subdividing the instrument into squares.

In the use of the system and instrumentalities set forth above in finding a point on a plan or a place on a map, the user of the same first turns to the directory or catalogue and finds the location number D (Fig. 4) of the place, supposing the marginal numbers are arranged as in Figure 1 of the drawing and the square location number is 44; then 40 will be found on the left margin and 4 at the top of the map and the crossing of lines on opposite sides of these numbers will define the square 44 on the map.

If the map has few details this will be sufficient and the place may be readily located. But if the map is large or has a great complication of details, the finding of a given place will be facilitated by further subdividing the square of the map. This may be done in any of the above described ways. It is my intention, however, not to have these squares permanently subdivided as this still further complicates a map. The second or square location number may be used in locating the place within the square and supposing the place is at 32 within square 44. The searcher (see Fig. 3) will find 30 on the left margin and 2 at the bottom of the instrument constructed as shown.

The location numbers may be associated in the directory with the name of the place, as shown in Figure 4 of the drawing, or one of the location numbers may be of one color and the other of another color. It is also possible within the purview of the invention to use maps of different scale sizes of the same locality in conjunction with each other in locating places, as a small desk map for use in locating the position of the squares and certain places and a wall map for use in locating more obscure places within the square. In this case where instruments of the above character are to be used in connection with the maps, there will of necessity be one for each of the two companion maps. It is also apparent from the above description that the system may be extended to three or more maps where greater and greater areas are to be covered.

The principle may be used in locating any place regardless of its importance or size on a small map by use of the location numbers in the directory associated with such names and the place finder proportional to the small map in connection therewith.

The system is eminently applicable to city maps but may be also applied to maps of all sorts and with plans which, in effect, are also maps.

Also, numerous other modifications and variations of the principles as laid down above may be resorted to within the scope of the invention as hereinbefore set forth and hereinafter claimed.

What I claim is:—

1. A place finder to be used in connection with the location of places on a map having transverse lines dividing the map into uniform squares, comprising an L-shaped member, the legs of which are at right angles to each other, said legs having numerals thereon spaced apart at regular intervals, and a square plate corresponding to one of the squares attached to the legs of the member and having rows of perforations therein aligned with the various numerals.

2. A place finder to be used in connection with the location of places on a map having uniformly placed lines forming uniform geometrical figures, comprising a member having legs which correspond to the angularity of the figures, said legs having numerals thereon spaced apart at regular intervals, and a reticulated square adjoining the member and having the reticulations coordinated with the numerals.

3. A device for use in locating a point upon a map or the like between the usual squares or like figures formed by the usual longitudinal, latitudinal lines thereon, comprising a plate of an area substantially equivalent to the area of one square of the map, said plate having a multiplicity of crossed markings corresponding to the said longitudinal and latitudinal lines for the purpose of dividing a map square into smaller similar units, and indicia associated with said crossed markings to facilitate location of a point in such selected square with reference to the map's data.

HERMAN GEYER.